United States Patent
Joung et al.

(10) Patent No.: US 9,537,517 B2
(45) Date of Patent: Jan. 3, 2017

(54) METHOD OF CONTROLLING UPLINK NOISE LEVEL IN MULTI-RU ENVIRONMENT

(71) Applicant: INNOWIRELESS CO., LTD., Gyeonggi-do (KR)

(72) Inventors: Jin Soup Joung, Gyeonggi-do (KR); Yong Hoon Lim, Seoul (KR); Seung Man Lee, Seoul (KR); Hee Jun Lee, Seoul (KR)

(73) Assignee: INNOWIRELESS CO., LTD. (KR)

(*) Notice: Subject to any disclaimer, the term of this patent is extended or adjusted under 35 U.S.C. 154(b) by 74 days.

(21) Appl. No.: 14/711,770

(22) Filed: May 14, 2015

(65) Prior Publication Data

US 2016/0173141 A1  Jun. 16, 2016

(30) Foreign Application Priority Data

Dec. 15, 2014 (KR) .................. 10-2014-0180313

(51) Int. Cl.
| | |
|---|---|
| *G01R 31/08* | (2006.01) |
| *H04B 1/04* | (2006.01) |
| *H04B 17/318* | (2015.01) |
| *H04W 52/52* | (2009.01) |
| *H04B 17/26* | (2015.01) |
| *H04B 17/345* | (2015.01) |

(52) U.S. Cl.
CPC ............ *H04B 1/0466* (2013.01); *H04B 17/26* (2015.01); *H04B 17/318* (2015.01); *H04B 17/345* (2015.01); *H04W 52/52* (2013.01)

(58) Field of Classification Search
CPC ........................................ H04J 3/14
See application file for complete search history.

(56) References Cited

U.S. PATENT DOCUMENTS

2011/0098076 A1* 4/2011 Kim .................. H04W 52/12
                                                           455/522

FOREIGN PATENT DOCUMENTS

KR     10-1022322 B1     3/2011

\* cited by examiner

*Primary Examiner* — Samina Choudhry
(74) *Attorney, Agent, or Firm* — Kaplan Breyer Schwarz & Ottesen, LLP

(57) ABSTRACT

Provided is a method of controlling an uplink noise level in a multi-radio unit (RU) environment in which each RU measures an ordinary noise level using a power monitoring function thereof when there is no user traffic and then controls an uplink noise level based on the ordinary noise level.

2 Claims, 3 Drawing Sheets

METHOD OF CONTROLLING UPLINK NOISE LEVEL IN MULTI-RU ENVIRONMENT

CROSS-REFERENCE TO RELATED APPLICATION

This application claims priority to and the benefit of Korean Patent Application No. 10-2014-0180313, filed on Dec. 15, 2014, the disclosure of which is incorporated herein by reference in its entirety.

FIELD OF THE INVENTION

The present invention relates to a method of controlling an uplink noise level in a multi-radio unit (RU) environment, and more particularly, to a method of controlling an uplink noise level in a multi-RU environment in which each RU measures an ordinary noise level using a power monitoring function thereof when there is no user traffic and then controls an uplink noise level based on the ordinary noise level.

BACKGROUND OF THE INVENTION

The development of the information industry requires technology for transmitting various kinds of large amounts of data at high speeds. To this end, a distributed antenna system (DAS) for removing a shadow region and extending coverage by providing a plurality of distributed antennas in an existing cell is being researched. A DAS is a system employing a plurality of distributed antennas connected to a single base station (BS) by wire or through a dedicated line, and the BS manages the plurality of distributed antennas which are a predetermined distance or more from each other in the cell served by the BS itself.

A DAS is distinguished from a centralized antenna system (CAS) in which a plurality of BS antennas are concentrated at the center of a cell in that a plurality of antennas are located a predetermined distance or more from each other in a cell. Also, a DAS is distinguished from a femto cell in that the unit of each distributed antenna does not have control over the region of the antenna but a BS at the center of a cell has control over all distributed antenna regions located in the cell.

Further, a DAS is distinguished from a multi-hop relay system in which a BS and a remote station (RS) are wirelessly connected or an ad-hoc network in that distributed antenna units (referred to as "RUs" below) are connected by wire or through a dedicated line. Moreover, a DAS is distinguished from a repeater structure for simply amplifying and transmitting a signal in that each distributed antenna may transmit different signals to respective terminals adjacent to the antenna according to control of a BS.

In such a DAS, RUs may support a single or multiple mobile terminals by simultaneously transmitting/receiving different data streams, and thus a DAS may be regarded as a multiple input multiple output (MIMO) system.

In a DAS, while a downlink signal is copied to each RU and then transmitted through the antenna of the RU, uplink signals are received through the antennas of all RUs and then combined and processed at a digital unit (DU). Therefore, the noise level of an uplink signal from one arbitrary RU affects the noise levels of uplink signals of all RUs.

Meanwhile, control of a noise level in a mobile communication system is intended to correct a noise level which changes along with a change of the gain of an input circuit over time. An uplink signal in a DAS is the sum of uplink signals received from all connected RUs. Therefore, when all the RUs have the same noise level, the noise level of an uplink signal finally combined at a DU increases in proportion to the number of connected RUs. On the other hand, when the noise levels of respective RUs are different, a noise level combined at a DU depends on an uplink signal of an RU having a relatively high noise level. In this case, the overall noise level is estimated to be higher than when all RUs have the same noise level, resulting in a relative reduction in cell coverage.

Therefore, it is necessary to optimize cell coverage by equally adjusting noise levels at all RUs, and for this sake, it is necessary to measure a pure noise level when there is no user traffic. To this end, Global Positioning System (GPS) equipment for measuring an absolute time may be installed in each RU, or a DU may frequently notify each RU of absolute time information. However, such a method complicates a system or a procedure and also increases cost.

This work was supported by the ICT R&D program of MSIP/KEIT, Republic of Korea. [10041628], Industrial Core Technology Development Project for next generation communication network]

RELATED DOCUMENTS

1. Korean Patent No. 10-1022322

SUMMARY OF THE INVENTION

The present invention is directed to providing an uplink noise level control method in a multi-radio unit (RU) environment in which each RU measures an ordinary noise level using a power monitoring function thereof when there is no user traffic and then controls the noise level of an uplink signal based on the ordinary noise level.

According to an aspect of the present invention, there is provided a method of controlling an uplink noise level performed by each of radio units (RUs) connected to one digital unit (DU) in a multi-RU environment, the method including: (a) measuring powers of all signals input for at least 24 hours N times an hour at time intervals of T; (b) selecting M pieces of data in order of increasing value from among hourly power data measured in operation (a); (c) estimating a noise power of every hour within 24 hours using a method of estimating a noise power of the corresponding hour by averaging the M pieces of data selected in operation (b); (d) selecting a minimum from among the noise powers estimated in operation (c) and determining the selected minimum as a noise power; and (e) adjusting a gain of an amplifier based on the determined noise power.

In the above-described configuration, operation (c) may include estimating a noise power of every hour within the 24 hours using a method of estimating a noise power of the corresponding hour by averaging the M pieces of data excluding data exceeding a reference value.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

A method of controlling an uplink noise level in a multi-radio unit (RU) environment according to an exemplary embodiment of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In general, noise is classified into dynamic noise coming from an antenna and static noise generated from a receiver circuit. In an exemplary embodiment of the present invention, static noise generated from a receiver circuit is regarded as a control target.

Figure 1:
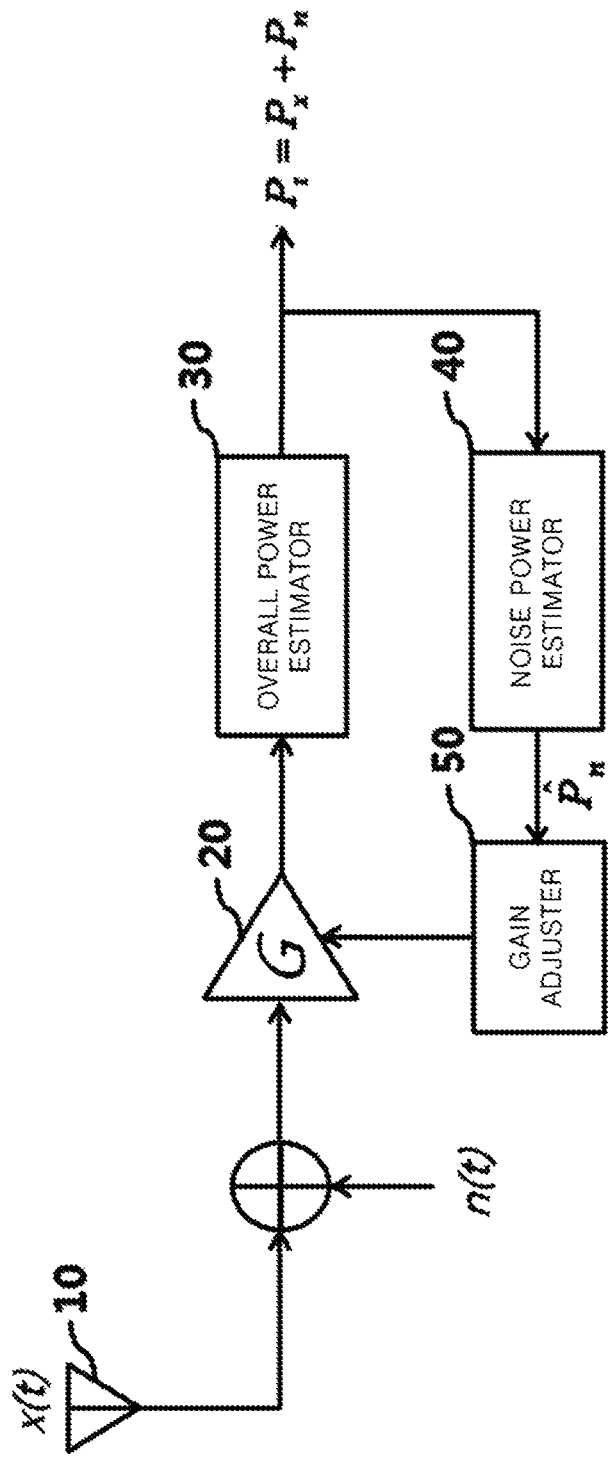
FIG. 1 is a functional block diagram for controlling a noise level in a method of controlling an uplink noise level in a multi-radio unit (RU) environment according to an exemplary embodiment of the present invention.

FIG. 1 is a functional block diagram for controlling a noise level in a method of controlling an uplink noise level in a multi-RU environment according to an exemplary embodiment of the present invention. Referring to a noise level control process in a method of controlling an uplink noise level in a multi-RU environment according to an exemplary embodiment of the present invention, as shown in FIG. 1, x(t) is a signal received through an antenna 10, and n(t) is a noise signal in each RU circuit. In general, the noise signal n(t) is combined with the received signal x(t) and then amplified together by a power amplifier 20, and thus is a control target of an exemplary embodiment of the present invention. An overall power estimator 30 functions to measure the powers of all input signals, and a noise power estimator 40 functions to estimate a noise power level in a circuit from all the powers estimated by the overall power estimator 30. A gain adjuster 50 functions to calculate a gain adjustment value based on the noise power estimated by the noise power estimator 40 and adjust a gain of the power amplifier 20.

Figure 2:
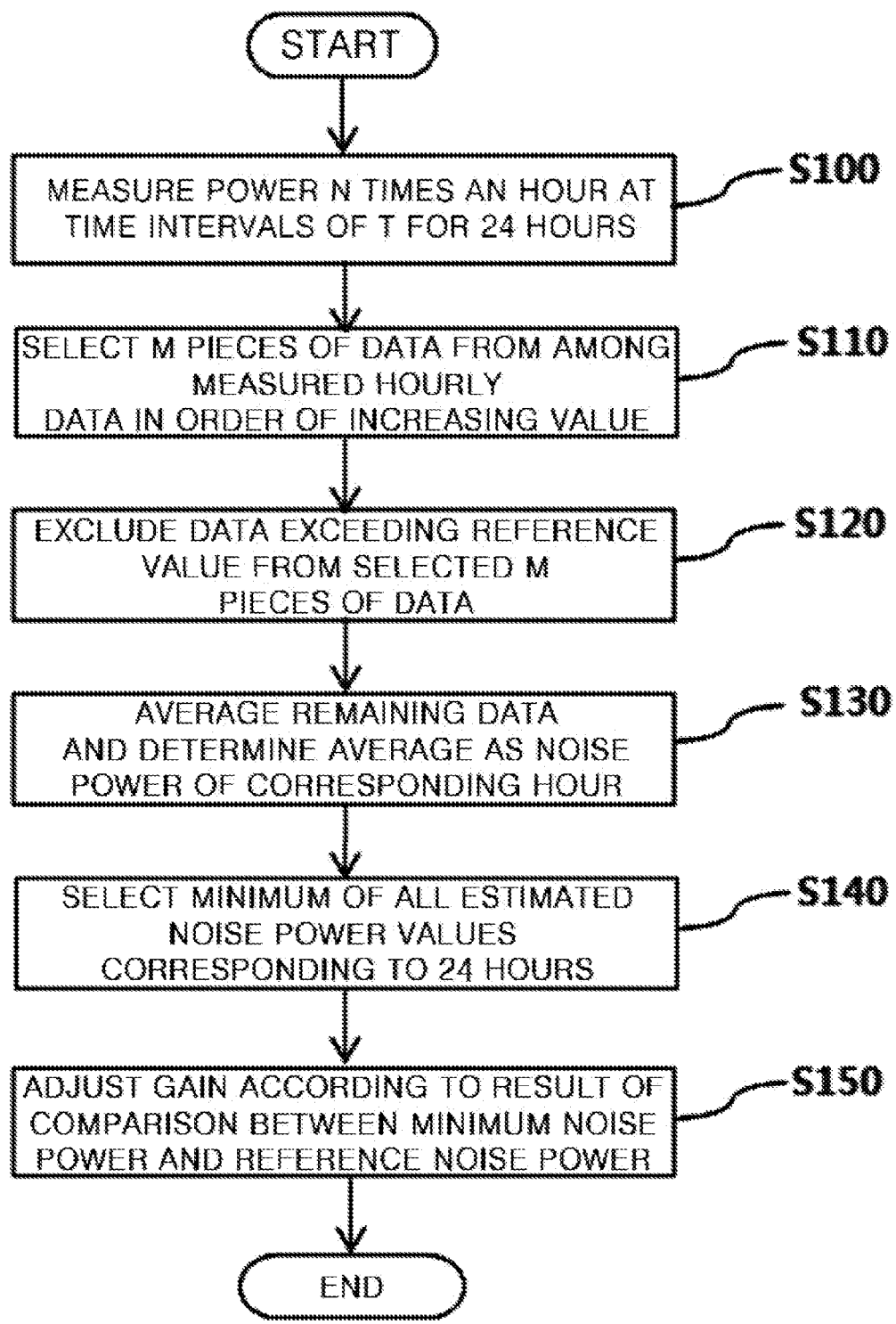
FIG. 2 is a flowchart illustrating a method of controlling an uplink noise level in a multi-RU environment according to an exemplary embodiment of the present invention.
Figure 3:
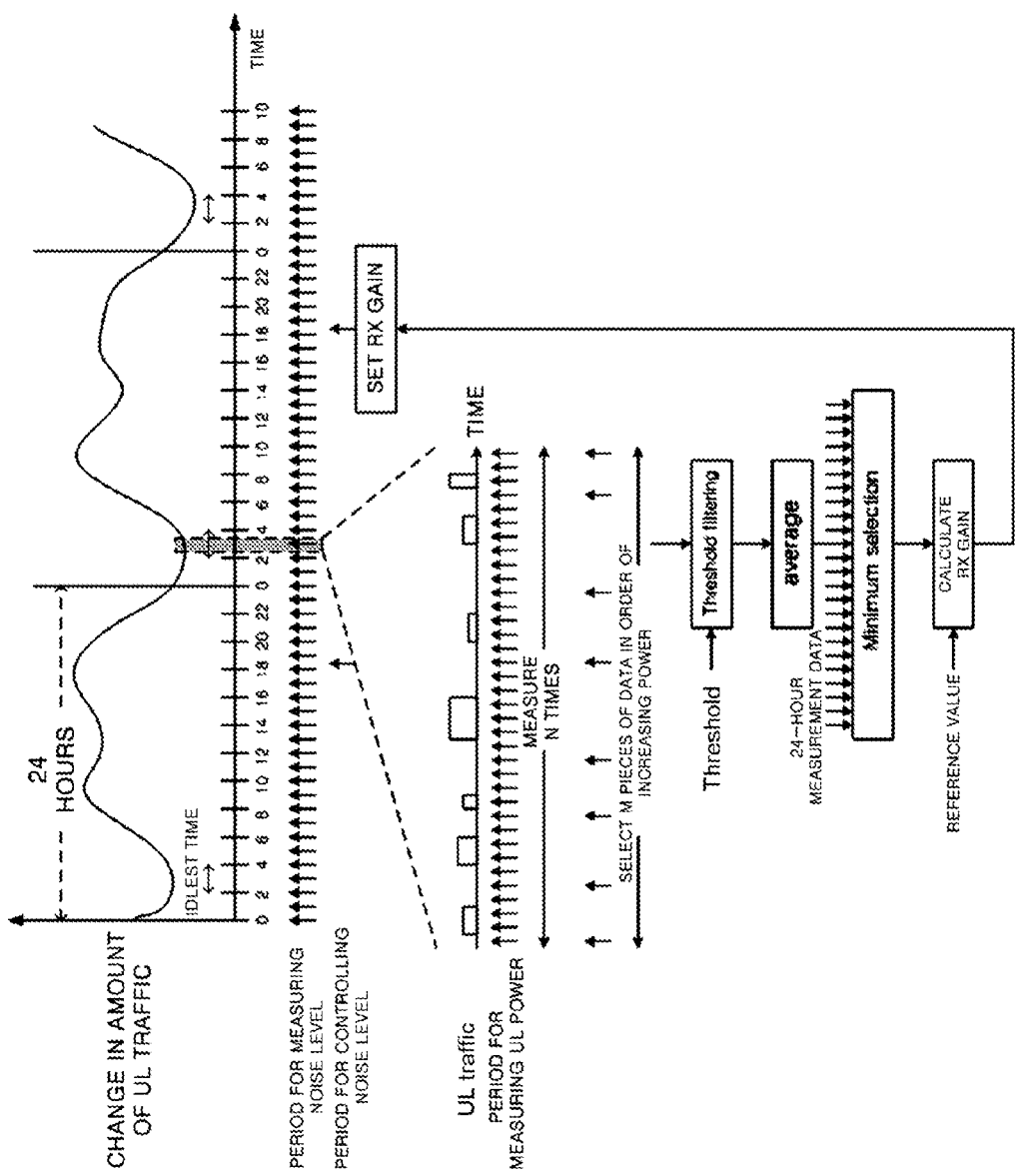
FIG. 3 is a diagram schematically illustrating a method of controlling an uplink noise level in a multi-RU environment according to an exemplary embodiment of the present invention.

FIG. 2 is a flowchart illustrating a method of controlling an uplink noise level in a multi-RU environment according to an exemplary embodiment of the present invention, and FIG. 3 is a diagram schematically illustrating a method of controlling an uplink noise level in a multi-RU environment according to an exemplary embodiment of the present invention. As shown in FIGS. 2 and 3, each RU in a multi-RU environment may measure a noise level at determined periods, for example, once every two days, and adjust a gain of a power amplifier. In this case, to measure a noise level without depending on an absolute time, the RU measures the powers of all signals input for at least 24 hours, for example, N times an hour at time intervals of T (operation S100).

Here, measurement of the powers may use all power values which are monitored (measured) by the RU in real time to prevent over-input. In a Long Term Evolution (LTE) system, an RU measures a power at every subframe period, that is, 1 ms. In an exemplary embodiment of the present invention, it is possible to collect a part of all power data obtained in this way. For example, it is possible to collect power data at intervals of one second, that is, 3600 times an hour.

Next, in operation S110, M, for example, 100, pieces of data are selected from among all power data collected every hour in this way in order of increasing value. In FIG. 3, red arrows show M pieces of data selected in this way. Next, in operation S120, data exceeding a threshold is excluded from the selected M pieces of data (threshold filtering). Operation S120 is provided because the power of an interference signal may be included in a measured power in the case of data exceeding the threshold.

Next, in operation S130, remaining power data is averaged, and the average is estimated as the noise power of the corresponding hour. In the subsequent operation S140, the noise powers of all hours within 24 hours are estimated in the same way, and then a minimum is selected (minimum selection) and determined as a noise power. In the example of FIG. 3, it can be seen that the time period between 2 AM and 4 AM is the idlest time in which there is almost no user traffic, that is, uplink signals.

Finally, in operation S150, the determined noise power is compared with a reference noise power to calculate an appropriate gain, and the gain of the power amplifier is adjusted according to the calculated gain, so that noise levels of all RUs are equally maintained.

As described above, in a method of controlling an uplink noise level in a multi-RU environment according to an exemplary embodiment of the present invention, the power of a received uplink signal is measured at determined points in time, a power estimated when there is no signal is selected from among the measured powers, and a noise power is estimated from the selected power. Subsequently, the estimated noise power is compared with a reference power to calculate a gain adjustment value, and then the gain adjustment value is applied to a gain. This process is applied commonly to all RUs, so that noise levels of all the RUs can be controlled to a uniform value.

According to the inventive method of controlling an uplink noise level in a multi-RU environment, an ordinary noise level is measured in a multi-RU environment without installing expensive Global Positioning System (GPS) equipment in each RU when there is no user traffic, and each RU can correct a noise level that naturally changes over time according to the ordinary noise level. Therefore, it is possible to prevent a change of cell coverage.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A method of controlling an uplink noise level performed by each of radio units (RUs) connected to one digital unit (DU) in a multi-RU environment, the method comprising:
    (a) measuring powers of all signals input for at least 24 hours N times an hour at time intervals of T;
    (b) selecting M pieces of data in order of increasing value from among hourly power data measured in operation (a);
    (c) estimating a noise power of every hour within 24 hours using a method of estimating a noise power of the corresponding hour by averaging the M pieces of data selected in operation (b);

(d) selecting a minimum from among the noise powers estimated in operation (c) and determining the selected minimum as a noise power; and (e) adjusting a gain of an amplifier based on the determined noise power.

2. The method of claim 1, wherein operation (c) comprises estimating a noise power of every hour within the 24 hours using a method of estimating a noise power of the corresponding hour by averaging the M pieces of data excluding data exceeding a reference value.

* * * * *